Sept. 28, 1954  J. A. DALE  2,690,553
TELEMETRIC DEVICE

Filed April 22, 1953  3 Sheets-Sheet 1

James A. Dale INVENTOR.
BY Bentley Morris
Attorney

Patented Sept. 28, 1954

2,690,553

UNITED STATES PATENT OFFICE 2,690,553

TELEMETRIC DEVICE

James A. Dale, Norris, Tenn., assignor to the United States of America as represented by the Tennessee Valley Authority Application April 22, 1953, Serial No. 350,540

3 Claims. (Cl. 340—359)

(Granted under Title 35, U. S. Code (1952), sec. 266)

The invention herein described may be manufactured and used by or for the Government for governmental purposes without payment to me of any royalty thereon.

This invention relates to improvements in telemetric devices. Its principal object is to provide an improved apparatus for measuring liquid level, temperature, rate of flow, pressure, or other property whose measurement can be resolved into rotation of a shaft through an angle proportionate to movement of a primary measuring device, and emitting a number of electrical impulses corresponding to the measurement obtained. Another object is to provide an improved keying device for translating such measurements into electrical impulses. Still another object is to provide a telemetric device having an improved electrical system, which is sturdy and dependable in operation and simple and cheap to build and maintain. Other objects and advantages will become apparent as this description proceeds.

I have found that these objects are attained in a device comprising in combination means for resolving movement of a primary measuring device into rotation of a shaft, or preferably a plurality of shafts interconnected in series through a means for stepped-down intermittent rotation, through a proportionate angle or series of angles; motor-driven means for emitting a sequence of electrical impulses at regular intervals of time; and means for interrupting the regular sequence of electrical impulses after a period of time determined by angular position of the shaft, or when a series of shafts is used, means for interrupting the regular sequence of electrical impulses after successive periods of time determined by angular position of each shaft in the series successively; and means for establishing emission of such sequence of electrical impulses after such interruptions.

Figure 1:
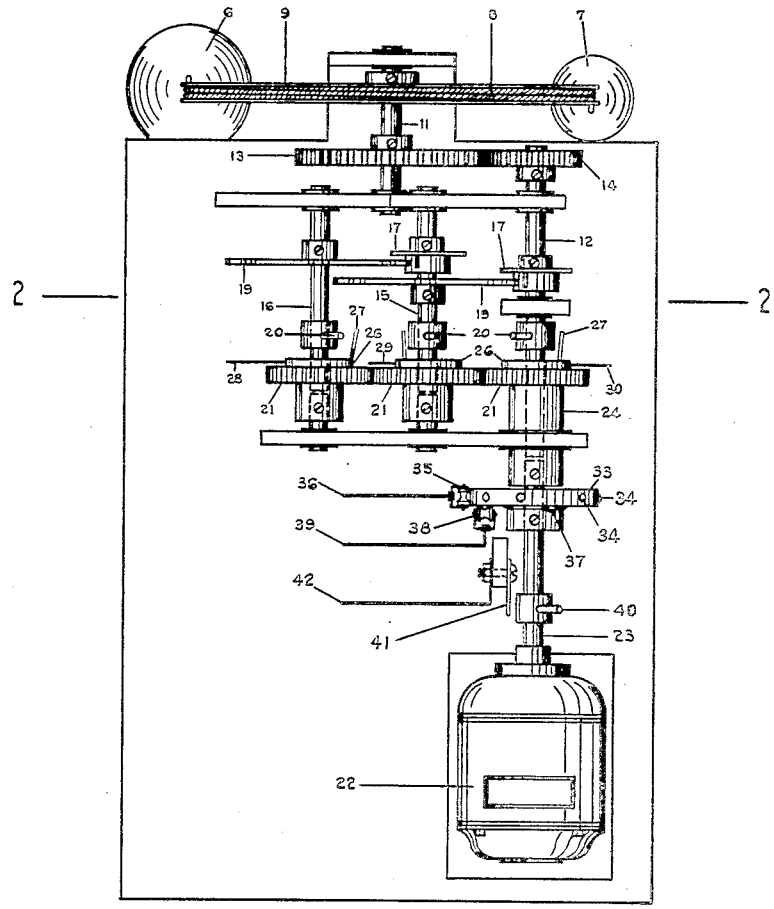
Figure 2:
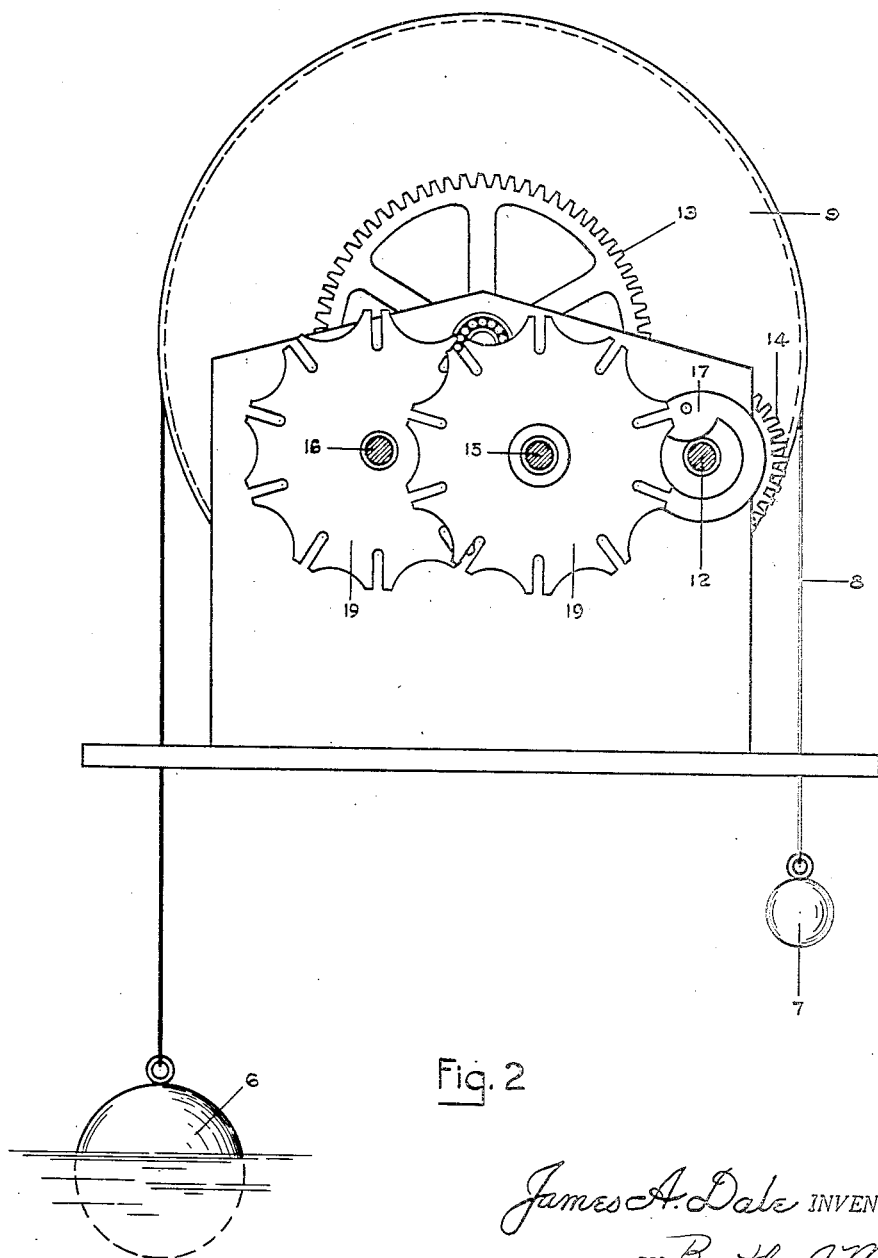
Figure 3:
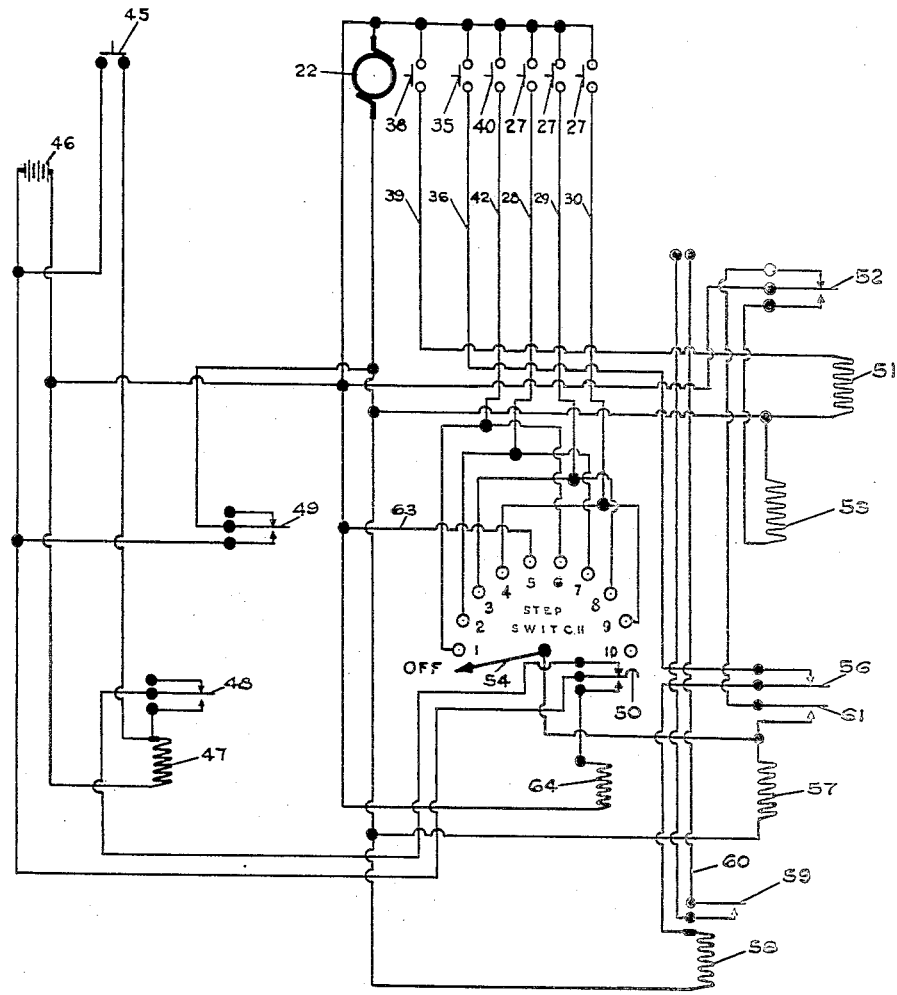

In the attached drawings Figure 1 is a plan of a keying device embodying principles of my invention. Figure 2 is a vertical section through the device of Figure 1 on the line 2—2, and Figure 3 is an electrical system embodying principles of my invention and operable by the device of Figure 1. Substantially all electrical wiring is omitted from Figures 1 and 2 for purposes of clarity in illustrating mechanical details of the keying device; this wiring is shown completely in Figure 3.

With reference to Figure 1, a suitable float 6 and counterweight 7 are attached to opposite ends of a cord 8 wound upon the circumference of a wheel 9 so that vertical movement of float 6 causes rotation of wheel 9 through an equal peripheral distance. Wheel 9 is attached to a freely rotatable shaft 11 which drives a second shaft 12 through a suitable train of gears 13 and 14. The structure so far described constitutes a means for resolving movement of a primary measuring device, float 6, into rotation of shaft 12 through an angle proportionate to movement of the primary measuring device. This angle may be very large, including a number of complete rotations.

Shafts 15 and 16 are disposed to be driven by rotation of shaft 12 through a means for intermittent rotary motion, illustrated more clearly in Figure 2 as a train of Geneva gearing, comprising two drive members 17 singly disposed on and rigidly attached to shafts 12 and 15 respectively, and two driven Geneva wheels 19, singly disposed upon and rigidly attached to each of shafts 15 and 16. This gearing is stepped down, preferably in 10 to 1 ratio, so that each succeeding shaft in the series is rotated through 36 degrees when its preceding shaft makes one complete revolution. The drive is through a means for intermittent rotation in order that each succeeding shaft in the series may be moved rapidly from one position to its next position, since slow movement through intermediate angles would introduce inaccuracies into emission of electrical impulses to be described later. By making the gear ratio 10 to 1, the angles through which the shafts are rotated are made to correspond to three places in the decimal system of number notation.

With reference to Figure 1, three contact members 20 are singly disposed upon and rigidly attached to each of shafts 12, 15, and 16. Three identical gears 21 are disposed singly and concentrically on each of shafts 12, 15, and 16 in free-floating relationship, so that rotation of gears 21 does not affect the position of shafts 12, 15, and 16. Gears 21 are driven by a motor 22 through a shaft 23 and sleeve 24. Motor 22 is a slow-speed motor, preferably of the constant-speed type, operating at about 10 R. P. M.

Each of gears 21 carries on its face an insulated slip ring 26 having a spring contact arm 27 of sufficient length to touch a contact member 20 and thus to close electric circuits 28, 29 and 30 when contact is made with contact members 20 carried by shafts 13, 15, and 12 respectively.

A code wheel 33 is rigidly mounted on shaft 23. This code wheel has a plurality of pressure members 34 disposed on it equidistant from each other in the arc of a circle, preferably nine members 34 disposed on its periphery at a distance of 36 degrees from each other, making a total arc of 288° as illustrated. A switch 35 is disposed to be actuated by pressure from each of pressure members 34 to close a circuit 36 momentarily as each member 34 passes the switch. A stud 37 is mounted on the code wheel at a point spaced from the circumference of the circle and between, or preferably midway between, the ends of the arc occupied by pressure members 34. A switch 38 is disposed to be actuated by pressure of stud 37 to close circuit 39 momentarily each time the code wheel revolves through 360 degrees.

A contact member 40 is mounted rigidly on shaft 23. A contact blade 41 is disposed in position to be touched by member 40 as shaft 23 revolves and thus to close a circuit 42 momentarily.

Operation of the device is most easily understood by considering Figures 1 and 3 together. An actuating device 45 is disposed to close a circuit from a source of direct current 46 through a relay 47 by momentary contact. Device 45 may be a clock-operated switch, a relay operated from a distant point, a switch of the push-button type, or any other device for causing momentary contact. Relay 47 has two movable contact points 48 and 49. Contact 48 operates to lock up the relay through a circuit normally closed by spring contact 50 of the step switch; and contact 49 closes a circuit to motor 22, thus starting the motor, and makes power available to all relays shown.

Code wheel 33 revolves until switch 38 is closed by pressure from stud 37 and relay 51 is operated momentarily. Relay 51 has a movable contact 52 which operates to close a circuit momentarily through step-switch actuating coil 53. Coil 53 moves contact arm 54 of the step switch from "Off" position to contact position No. 1, thus making power available to circuit 42, to be closed later by contact member 40 mounted on shaft 25.

As code wheel 33 revolves, pressure members 34 actuate switch 35 in turn, thus setting up a sequence of electrical impulses at regular intervals of time in circuit 36, which passes through a normally closed contact 56 of a relay 57 and includes a relay 58. Relay 58 is thus pulsated and at each pulsation movable contact 59 closes output circuit 60, which may carry 110 v. A. C. or any other type of current desired.

This sequence of electrical impulses continues for a period of time determined by the angular distance between contact member 40 on shaft 23 and stud 37 on code wheel 33. This distance is determined when member 40 is attached to the shaft; and when a number of these telemetric devices are to be installed at different locations suitable angles may be chosen to permit the number of impulses emitted by each instrument before contact of corresponding members 40 with blades 41 to serve as station identification.

Contact of member 40 with blade 41 interrupts emission of electrical impulses by momentarily closing circuit 42, through the No. 1 contact of the step switch, contact arm 54, and relay 57. Relay 57 operates the movable contact 56 to open circuit 36 and locks up through contact 61. Emission of impulses thus remains interrupted until code wheel 33 completes a revolution and stud 37 again actuates switch 38 to close circuit 39.

Relay 51 in circuit 39 then operates, unlocking relay 57, and completing the circuit to stepswitch actuating coil 53 by movement of contact 52. Emission of impulses through circuit 36 is reestablished on closure of contact 56 and continues until contact arm 27 makes contact with contact member 29 on shaft 16, momentarily closing circuit 28 through contact No. 2 of the step switch, contact arm 54, and relay 57. This relay again operates, locking up through contact 61 and opening contact 56 in circuit 28. Relay 57 remains locked until code wheel 33 completes its revolution and stud 37 again actuates switch 38 to close circuit 39 momentarily.

Relay 51 in circuit 39 then operates, unlocking relay 57 and operating step-switch actuating coil 53 through movable contact 52. Contact arm 54 is thereby moved to contact No. 3 of the step switch and emission of impulses through circuit 36 is reestablished and continues until interrupted when contact arm 27 makes contact with contact member 20 on shaft 15, momentarily closing circuit 29 through contact No. 3 of the step switch, contact arm 54, and relay 57, as described above.

When code wheel 33 completes its revolution, stud 37 again actuates switch 38, momentarily closing circuit 39, operating relay 51 and stepswitch actuating coil 53, which moves stepswitch contact arm 54 to contact No. 4 of that switch. Emission of the sequence of impulses through circuit 36 is reestablished and continues until interrupted by momentary contact of contact arm 27 with member 20 on shaft 12, closing circuit 30.

When stud 37 next actuates switch 38, contact arm 54 is moved to position No. 5, closing circuit 63 through relay 57. Since this circuit remains closed, circuit 36 is not pulsated for one entire revolution of the code wheel.

The next contact of stud 37 with switch 38 results in moving contact arm 54 to position No. 6 on the step switch, and the entire sequence of operations described above with reference to contacts 1, 2, 3, and 4 of the step switch is repeated. This repetition is especially advantageous when an audio or visual means for observing electrical impulses are operated at a distant station by output circuit 60.

Contacts Nos. 5–9 inclusive and their corresponding connections may be omitted from the step switch if desired, but 10 contact step switches having actuating coils 53 and reset coils 64 are readily available from manufacturers of electrical supplies and may be cheaper, especially if only small lots are desired, than specially constructed step switches.

When contact arm 54 is moved to position No. 10 on the step switch, spring arm 50 is moved mechanically by contact arm 54 to close a circuit through reset coil 64 which resets contact arm 54 in the "Off" position. Movement of spring arm 54 also opens the locking circuit through relay 47, thus permitting contact 49 to return to its normally open position, cutting off power from the motor and relay system. Motor 22 has sufficient momentum to rotate through a few degrees, preferably about 20 degrees. This carries stud 37 out of contact with switch 38 and when the actuating device 45 is closed a series of impulses will be emitted through circuit 36, and these impulses continue until the code wheel completes its revolution with contact arm 54 in "Off" position. This series of impulses can be used to start a recording device when such device is connected in output circuit 60; or can be used to attract the attention of an operator when a clock-operated or other automatic actuating device 45 is used together with audio or visual means for observing impulses. On completion of this revolution of the code wheel, circuit 39 again actuates relay 51 advancing contact arm 54 to position No. 1 on the step switch, and the cycle of operations described above begins.

It will readily be seen that many variations may be introduced into the device described. For instance a lever, gear and ratchet, or other element moved directly by a primary measuring device, may be substituted for wheel 9; many types of drive mechanisms may be substituted for gears 13 and 14; the series of shafts 12, 15, and 16 may be increased or decreased in number as desired with corresponding addition or subtraction of circuits passing through the step switch; a step switch having more or less than 10 positions may be used; many types of mechanisms for producing intermittent rotary motion are known and may be substituted for the train of Geneva gearing described; the ratio at which the shaft-drive mechanism is stepped down need not be 10 to 1; the motor may be driven by a relay-operated circuit carrying 110 v. A. C.; and the device may be adapted to measurement of any property which can be resolved into angular rotation of a shaft or can be incorporated in a servo system for plant control. All these variations and many others may be made in the device without departing from the spirit and scope of my invention, which is limited only by the subtended claims.

I claim as my invention:

1. A telemetric device comprising in combination a plurality of rotatably mounted shafts interconnected in series through a train of Geneva gearing stepped down in 10 to 1 ratio from shaft to succeeding shaft; a primary measuring device; means for resolving movement of the primary measuring device into rotation of the shafts through angles proportionate to such measurement, comprising a train of gears disposed to be driven by movement of the primary measuring device and to drive the first shaft of the series; a source of direct current; means for emitting a sequence of electrical impulses at regular intervals of time, comprising a slow constant-speed motor, a code wheel driven by the motor, a series of nine pressure members mounted on the circumference of the code wheel at an angular distance of 36 degrees from each oother, and an electric circuit connected to a first switch disposed to be closed by contact with each of the pressure members in turn; means for interrupting the sequence of electrical impulses after each of successive periods of time determined by angular position of each shaft in the series successively, comprising a series of contact members singly disposed upon and carried by each of the shafts, a series of spring contact arms driven by the motor at slow constant speed singly disposed to rotate around each of the shafts in position to touch the corresponding contact member in passing, a step switch having a movable contact arm and a series of contact positions occupied by the contact arm successively, a first relay having normally closed points connected in circuit closed by said first switch and normally open points in a circuit locking said first relay, and a series of circuits all passing through said first relay and connected singly between each of said spring contact arms and corresponding contact positions on the step switch; and means for reestablishing emission of such sequence of electrical impulses, comprising a stud mounted on a side of the code wheel midway between the ends of the arc occupied by the series of pressure members, a switch disposed to be closed by contact with the stud, and a circuit closed by the last-mentioned switch to a second relay connected simultaneously to unlock said first relay and to actuate said contact arm of said step switch to its next succeeding position.

2. A telemetric device comprising in combination a plurality of rotatably mounted shafts interconnected in series through a train of Geneva gearing stepped down from shaft to succeeding shaft; a primary measuring device; means for resolving movement of the primary measuring device into rotattion of the shafts through angles proportionate to such movement; a source of direct current; means for emitting a sequence of electrical impulses at regular intervals of time, comprising a slow constant-speed motor, a code wheel driven by the motor, a series of pressure members mounted on the code wheel at points equidistant from each other in an arc of a circle thereon, and an electric circuit connected to a first switch disposed to be closed by contact with each of the pressure members in turn; means for interrupting the sequence of electrical impulses after each of successive periods of time determined by angular position of each shaft in the series successively, comprising a series of contact members singly disposed upon and carried by each of the shafts, a series of spring contact arms driven by the motor at slow constant speed singly disposed to rotate around each of the shafts in position to touch the corresponding contact member in passing, a step switch having a movable contact arm and a series of contact positions occupied by the contact arm successively, a first relay having normally closed points in the circuit closed by said first switch and normally open points in a circuit locking said first relay, and a series of circuits all passing through said first relay and connected singly between each of said spring contact arms and corresponding contact positions on the step switch; and means for reestablishing emission of such sequence of electrical impulses, comprising a stud mounted on a code wheel at a point spaced from said circle and midway between the ends of the arc occupied by the series of pressure members, a switch disposed to be closed by contact with the stud, and a circuit closed by the last-mentioned switch to a second relay connected simultaneously to unlock said first relay and to actuate said contact arm of said step switch to its next succeeding position.

3. A telemetric device comprising in combination a plurality of rotatably mounted shafts interconnected in series through mechanical means for stepped-down intermittent rotation from shaft to succeeding shaft; a primary measuring device; means for resolving movement of the primary measuring device into rotation of the shafts through angles proportionate to such movement; a source of direct current; means for emitting a sequence of electrical impulses at regular intervals of time, comprising a slow constant-speed motor, a code wheel driven by the motor, a series of pressure members mounted on the code wheel at points equidistant from each other in an arc of a circle thereon, and an elertric circuit connected to a first switch disposed to be closed by contact with each of the pressure members in turn; means for interrupting the sequence of electrical impulses after each of the successive periods of time determined by angular position of each shaft in the series successively, comprising a series of contact members singly disposed upon and carried by each of the shafts, a series of spring contact arms driven by the motor at slow constant speed singly disposed to rotate around each of the shafts in position to touch the corresponding contact member in passing, relay-operated means for opening said circuit and keeping it open for the remainder of a revolution of the code wheel on contact of each of said spring contact arms with its corresponding contact member in successive revolutions of the code wheel; and means for reestablishing emission of such sequence of electrical impulses, comprising a stud mounted on a code wheel at a point spaced from said circle and midway between the ends of the arc occupied by the series of pressure members, a switch disposed to be closed by contact with the stud; and relay-operated means, actuated by the last-mentioned switch, for restoring the circuit opened by the relay-operated means first mentioned.

References Cited in the file of this patent

UNITED STATES PATENTS

| Number | Name | Date |
|---|---|---|
| 2,116,372 | Weld | May 3, 1938 |
| 2,168,149 | Arnold | Aug. 1, 1939 |
| 2,240,937 | McNaney | May 6, 1941 |
| 2,510,093 | Ferguson | June 6, 1950 |